(12) United States Patent
Born (10) Patent No.: US 8,561,766 B2
(45) Date of Patent: Oct. 22, 2013

(54) PISTON-CYLINDER UNIT

(75) Inventor: Frank Born, Dienethal (DE)

(73) Assignee: Stabilus GmbH, Koblenz (DE)

( * ) Notice: Subject to any disclaimer, the term of this patent is extended or adjusted under 35 U.S.C. 154(b) by 231 days.

(21) Appl. No.: 13/015,946

(22) Filed: Jan. 28, 2011

(65) Prior Publication Data

US 2011/0186394 A1 Aug. 4, 2011

(30) Foreign Application Priority Data

Jan. 29, 2010 (DE) .......................... 10 2010 006 117

(51) Int. Cl.
*F16F 9/50* (2006.01)

(52) U.S. Cl.
USPC ................... 188/282.4; 188/289; 188/322.15; 188/285

(58) Field of Classification Search
None
See application file for complete search history.

(56) References Cited

U.S. PATENT DOCUMENTS

| | | | | |
|---|---|---|---|---|
| 4,313,529 A * | 2/1982 | Kato et al. | ................. | 188/266.4 |
| 4,326,314 A * | 4/1982 | Moret et al. | ................... | 15/22.1 |
| 4,436,163 A * | 3/1984 | Simpson | ....................... | 173/117 |
| 4,645,042 A * | 2/1987 | Inoue et al. | ................ | 188/282.4 |
| 4,666,180 A * | 5/1987 | Shirakuma | ................ | 188/266.8 |
| 4,702,123 A * | 10/1987 | Hirao et al. | ..................... | 74/526 |
| 5,193,655 A * | 3/1993 | Sasaki et al. | ............... | 188/282.4 |
| 5,311,633 A * | 5/1994 | Herzog et al. | .................... | 15/28 |
| 5,316,114 A * | 5/1994 | Furuya et al. | .............. | 188/266.4 |
| 5,381,576 A * | 1/1995 | Hwang | .......................... | 15/22.1 |
| 5,402,867 A * | 4/1995 | Nakadate et al. | ......... | 188/282.4 |
| 5,522,483 A * | 6/1996 | Koch | .......................... | 188/282.2 |
| 6,439,071 B2 * | 8/2002 | Bermudez Perez | .............. | 74/40 |

FOREIGN PATENT DOCUMENTS

DE 10 2007 018 582 11/2008

* cited by examiner

*Primary Examiner* — Thomas Irvin
(74) *Attorney, Agent, or Firm* — Cozen O'Connor (57) ABSTRACT

A piston-cylinder with a work cylinder filled with a fluid, a hollow piston rod displaceably arranged in the work cylinder along a longitudinal axis, a connection element at an end located outside the work cylinder and in the work cylinder, a piston that divides the work cylinder into first and second work spaces. A valve needle in the piston rod has a channel extending in axial direction arranged in the piston rod. The valve needle has a recess at one end. The valve needle is rotatable such that a flow of fluid is controllable. A lever extends in radial direction and is swivelably acted upon by an adjusting unit at the end of the valve needle outside the work cylinder. The adjusting unit is arranged at the connection element entirely outside the flow of force of the piston-cylinder unit.

8 Claims, 6 Drawing Sheets

PISTON-CYLINDER UNIT

BACKGROUND OF THE INVENTION

1. Field of the Invention

The invention is directed to a piston-cylinder unit with a work cylinder filled with a fluid under pressure, a hollow piston rod arranged coaxial to the work cylinder and is displaceable in the work cylinder along a center longitudinal axis having a connection element at the end located outside the work cylinder and, at the end located in the work cylinder, a piston dividing the work cylinder into a first work space and a second work space, and a valve needle arranged in the piston rod. At least one throughflow channel extending in axial direction is arranged in the piston rod. The valve needle has a recess at one end, the valve needle being rotatable into a position such that the recess and throughflow channel are located opposite one another in a defined area, and a flow of fluid is controllable.

2. Description of the Related Art

A piston-cylinder unit of the type mentioned above is known from DE 10 2007 018 582 A1.

SUMMARY OF THE INVENTION

It is an object of one embodiment of the invention to provide a more reliably functioning and more economical piston-cylinder unit with an electric adjusting unit having a shorter structural length.

A lever that extends in radial direction and is swivelably acted upon by an adjusting unit is formed at an end of the valve needle situated outside the work cylinder, the adjusting unit being arranged entirely outside the flow of force of the piston-cylinder unit.

In one embodiment, the adjusting unit comprises a housing in which an electrically driven motor and, optionally, a gear unit are accommodated, wherein a shaft which is drivable by the motor and gear unit projects out of the housing axially parallel to the valve pin or needle and extends through a first connection plate of a fastening element for fastening the housing to the connection element.

To facilitate assembly, the fastening element according to one embodiment of the invention comprises a first connection plate that can be connected to the housing and a second connection plate that can be connected to the connection element, the second connection plate having an opening that can be made to overlap with a bore hole in the connection element in order to connect the second connection plate to the connection element by a bolt.

A particularly simple construction of the adjusting unit is achieved in that the first connection plate and second connection plate are constructed in one piece and are arranged at an angle of substantially 90° relative to one another.

A more secure connection of the adjusting unit to the connection element is achieved in that an extension which at least partly encloses an edge of the connection element is formed at the second connection plate and a flanking wall is formed at the first connection plate.

According to one embodiment of the invention, a disk having a recess and a receiving device is fastened to the shaft, wherein a bolt having a through-bore which extends radially with respect to its longitudinal axis and through which the lever extends is rotatably supported in the receiving device.

A stop cam with a first stop face and a second stop face is advantageously formed at the side of the first connection plate facing the disk and projects into the recess of the disk.

In one embodiment, a stepper motor, which sets the shaft in rotation, is arranged in the housing, the shaft being constructed as a threaded spindle and extending substantially perpendicular to the center longitudinal axis of the piston rod or valve pin.

In one embodiment, the first connection plate and the second connection plate are connected to one another by a tie plate and are aligned substantially parallel to one another, wherein a web extends from the second connection plate along the tie plate in direction of the first connection plate.

According to one embodiment of the invention, a slide which is substantially U-shaped in cross section and has a base, a first leg and a second leg is arranged so as to lie on the connection element and the second connection plate.

In an advantageous manner, each leg of the slide has a cutout at the side facing the first connection plate, a square spindle nut through which the shaft extends being inserted in the cutout.

So that the slide is guided more securely, the holding finger has a substantially U-shaped profile and encloses the first leg of the slide. Further, a bore hole through which the bolt extends so as to be rotatable is provided in the second leg of the slide, the bolt having an axial slot into which the lever projects so that assembly is facilitated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described with reference to the following drawings. The drawings show.

DETAILED DESCRIPTION OF THE PRESENTLY PREFERRED EMBODIMENTS

Figure 1:
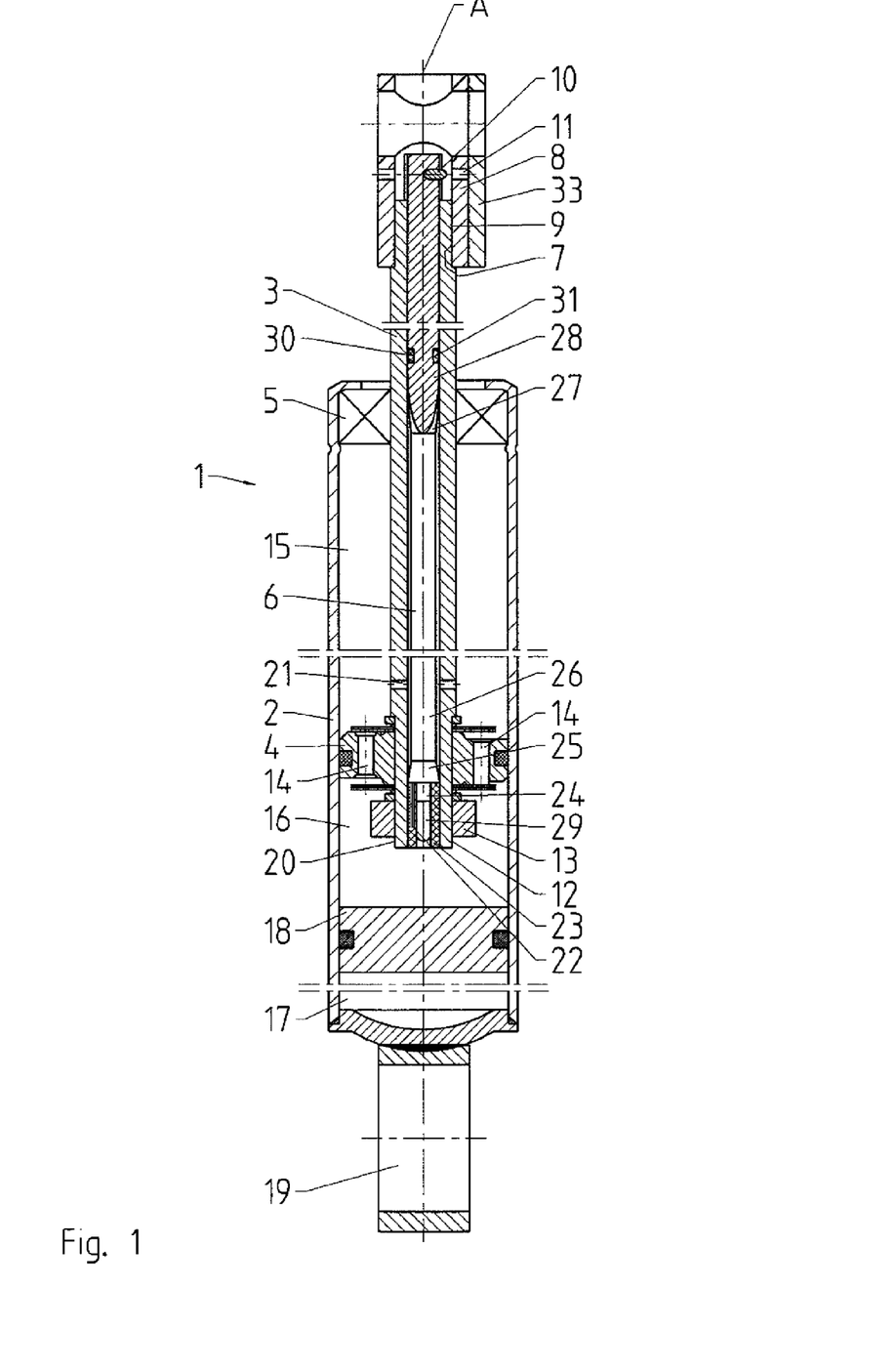
FIG. 1 is a piston-cylinder unit in longitudinal section.

FIG. 1 shows a known piston-cylinder unit 1 in the form of a monotube damper with a cylinder 2, a hollow piston rod 3, which is arranged so as to be displaceable in the cylinder 2, and a piston 4 arranged at the hollow piston rod 3. The piston rod 3 is guided out of the cylinder 2 at one end of the cylinder 2 through a sealing and guiding device 5. By the sealing and guiding device 5, the piston rod 3 is guided coaxial to the cylinder 2 so as to be movable back and forth along a center longitudinal axis A and seals the interior of the cylinder 2 against the environment.

A valve needle 6, by which the damping force of the piston-cylinder unit can be changed, is arranged in the hollow piston rod 3.

An external thread 7, by which a connection element 8 can be fastened with an internal thread 9, is located at the end of the piston rod 3 opposite the piston 4. One end of the valve needle 6 is guided out of the connection-side end of the piston rod 3. At the end of the valve needle 6 that is guided out, a lever 10 extends in radial direction from the latter through an opening 11 in the connection element 8. The end of the piston rod 3 opposite the connection element 8 likewise has an external thread 12 on which the piston 4 is screwed. A locking nut 13 which is also screwed on to the external thread 12 ensures that the piston 4 does not disengage from the piston rod 3. Other fastening techniques, e.g., caulking or welding, are also conceivable.

The piston 4 preferably comprises at least one throttle bore 14 via which the fluid, preferably oil, can flow from a first work space 15 to a second work space 16, or vice versa.

Adjoining the second work space 16 is a compensation space 17, the second work space 16 and the compensation space 17 being separated from one another by a dividing piston 18.

A connection element 19 preferably in the form of a knuckle eye is arranged at the end of the cylinder 2 opposite the sealing and guiding device 5.

At an end of the piston rod 3 which is located in the interior of the cylinder 2 in the assembled state of the piston-cylinder unit 1, an area 20 is formed with a smaller diameter at which the piston 4 is arranged. The connection element 8 is arranged at the end opposite the area 20; the lever 10 which is connected to the valve needle 6 extends radially outward through the connection element 8.

At least one bore hole 21 is provided in the area of the piston rod extending from the area 20 with the smaller diameter to the connection element 8. The fluid can flow into the hollow piston rod 3 through this bore hole 21 when the piston rod 3 is moved out of the piston-cylinder unit 1 or flow out when the piston rod 3 has moved into the piston-cylinder unit 1 and, in so doing, the valve needle 6 has released a throughflow channel 22.

A cylindrical sleeve 23 is arranged in the hollow piston rod 3, preferably in area 20. The sleeve 23 has a projection, not shown, which fits into a cutout, not shown, in the piston rod 3 to form a preventing rotation element. Further, the sleeve 23 has the at least one throughflow channel 22 which extends in axial direction at the inner side of the sleeve 23 from the end of the sleeve 23 facing the first work space 15 and terminates before reaching the end of the sleeve 23 facing the second work space 16.

The valve needle 6 extends in axial direction from the piston-side end of the piston rod 3 into the connection element 8. The valve needle 6 has a plurality of portions with different diameters. A first portion 24 is located in the sleeve 23 at the end of the piston rod 3 situated in the piston-cylinder unit 1. Adjoining the portion 24 in axial direction is a conically shaped second portion 25 which has a larger diameter toward portion 24 and which substantially corresponds to, or is slightly smaller than, the inner diameter of the inner wall of the piston rod 3. Accordingly, portions 24 and 25 form a step so that the valve needle 6 is supported at the sleeve 23 and an axial displacement of the valve needle 6 is prevented. A third portion 26 with a smaller diameter than the diameter of the inner wall of the piston rod 3 adjoins the second portion 25, followed by a conically shaped fourth portion 27, wherein the diameter increases toward a fifth portion 28. Portion 28 has a diameter which substantially corresponds to, or is slightly smaller than, the inner diameter of the inner wall of the piston rod 3.

The valve needle 6 has, in the first portion 24, a recess 29 that extends in axial direction from the end of the valve needle 6 facing the second work space 16 and, therefore, in direction of the second portion 25 and ends before reaching the area of the sleeve 23 that faces the first work space 15. By rotating the valve needle 6, the recess 29 can be made to overlap at least one of the throughflow channels 22 in such a way that fluid is allowed to flow parallel to the throttle bores 14 formed in the piston 4.

The bore hole 21 is arranged in the area of the piston rod 3 in which the third portion 26 of the valve needle 6 is situated so that the fluid can overflow from one work space to the other.

The fifth portion 28 of the valve needle 6 has a circumferentially extending annular groove 30 in which a sealing ring 31, preferably an O-ring seal is inserted so that the fluid cannot exit via the hollow piston rod 3. The lever 10 is arranged at the fifth portion 28 of the valve needle 6 facing the connection 8 and is guided out of the connection element 8 through the opening 11, the valve needle 6 being movable by this lever 10.

In FIG. 1, the valve needle 6 is adjusted in such a way that it is not possible for fluid to flow through the piston rod 3. When the lever 10 is moved toward the left out of its right-hand position, shown here, the valve needle 6 is rotated, the recess 29 and at least one throughflow channel 22 of the sleeve 23 overlap, and the fluid is allowed to overflow from one work space into the other.

Figure 2:
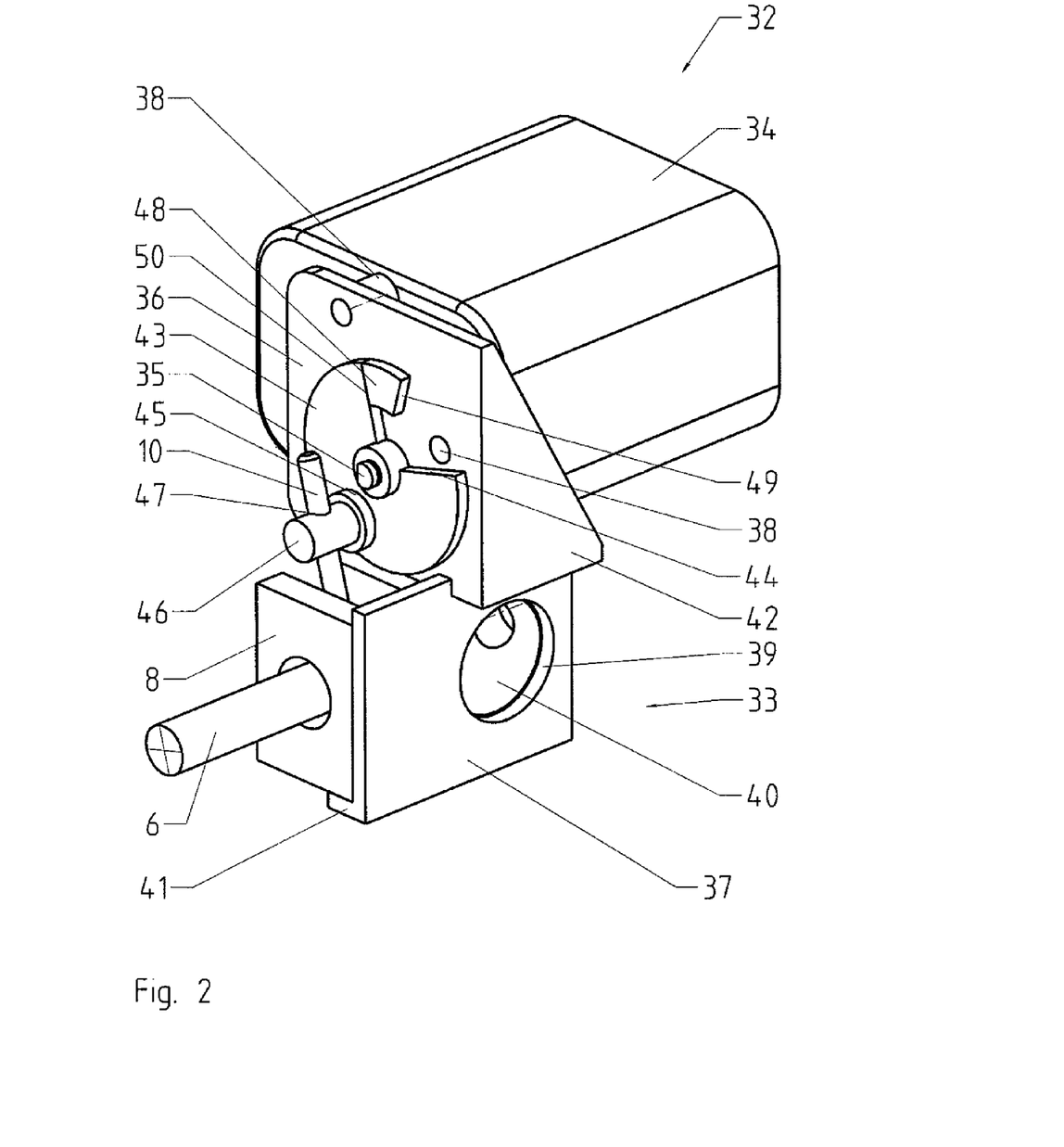
FIG. 2 is a first embodiment of an adjusting unit according to the invention.
Figure 3:
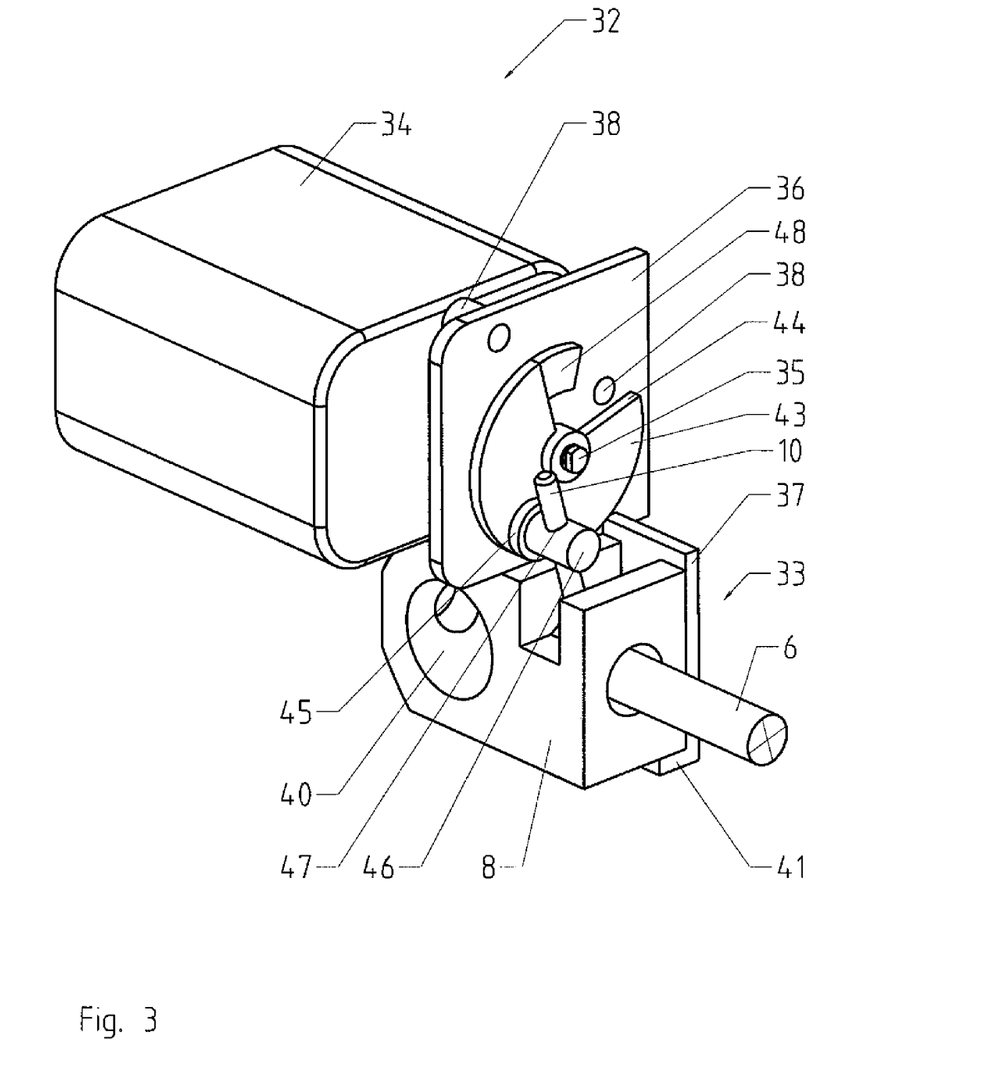
FIG. 3 is a detailed view of the adjusting unit according to the embodiment of FIG. 2.

An electric adjusting unit 32, which is shown in detail in FIGS. 2 and 3, but of which only a portion of a fastening element 33 is visible in FIG. 1, is arranged at the connection element 8. When the valve needle 6 is controlled in a corresponding manner by the lever 10, the adjusting unit 32 can rotate into another position so as to adjust the damping force of the piston-cylinder unit 1.

Further, it can be seen in FIGS. 2 and 3 that the adjusting unit 32 comprises a housing 34 in which an electrically driven motor and possibly also a gear unit are accommodated. A shaft 35, which is drivable by the motor or gear unit, projects out of the housing 34 axially parallel to the valve needle 6 and extends through a first connection plate 36 of the fastening element 33. The housing 34 can be connected to the connection element 8 by the fastening element 33.

In addition to the first connection plate 36, which can be connected to the housing 34, the fastening element 33 comprises a second connection plate 37 that can be connected to the connection element 8. The first connection plate 36 has two connection devices 38 that serve as spacers relative to the housing 34 and, at the same time, serve to receive screws, not shown in detail, for screwing the first connection plate 36 to the housing 34. The second connection plate 37 has an opening 39 which is made to overlap with a bore hole 40 in the connection element 8. The second connection plate 37 can be connected to the connection element 8 by a bolt, not shown, which extends through the opening 39 and the bore hole 40.

The first connection plate 36 and second connection plate 37 form one piece and are arranged at an angle of substantially 90° to one another. To improve the stability of the fastening element 33 and to arrange it correctly at the connection element 8, an extension 41 which at least partly encloses an edge of the connection element 8 is formed at the second connection plate 37 and a flanking wall 42 is formed at the first connection plate 36.

A disk 43 having a recess 44 and a receiving device 45 is fastened to the shaft 35. A bolt 46 is rotatably supported in the receiving device 45. The bolt 46 has a through-bore 47 which extends radial to its longitudinal axis and through which the lever 10 extends. The bolt 46 can have a head, not shown, sitting in the disk 43, this head having a larger diameter at the side facing the first connection plate 36 so as to sit captively in the receiving device 45.

A stop cam 48 with a first stop face 49 and a second stop face 50 is formed at the side of the first connection plate 36 facing the disk 43 and projects into the recess 44 of the disk 43. The disk 43 and the shaft 35 can carry out a rotational movement only until the disk 43 contacts the stop cam 48. When the disk 43 contacts the first stop face 49 of the stop cam 48, the valve needle 6 is rotated in such a way that fluid can flow from one work space to the other; when contacting the second stop face 50, the at least one throughflow channel 22 is closed.

Figure 4:
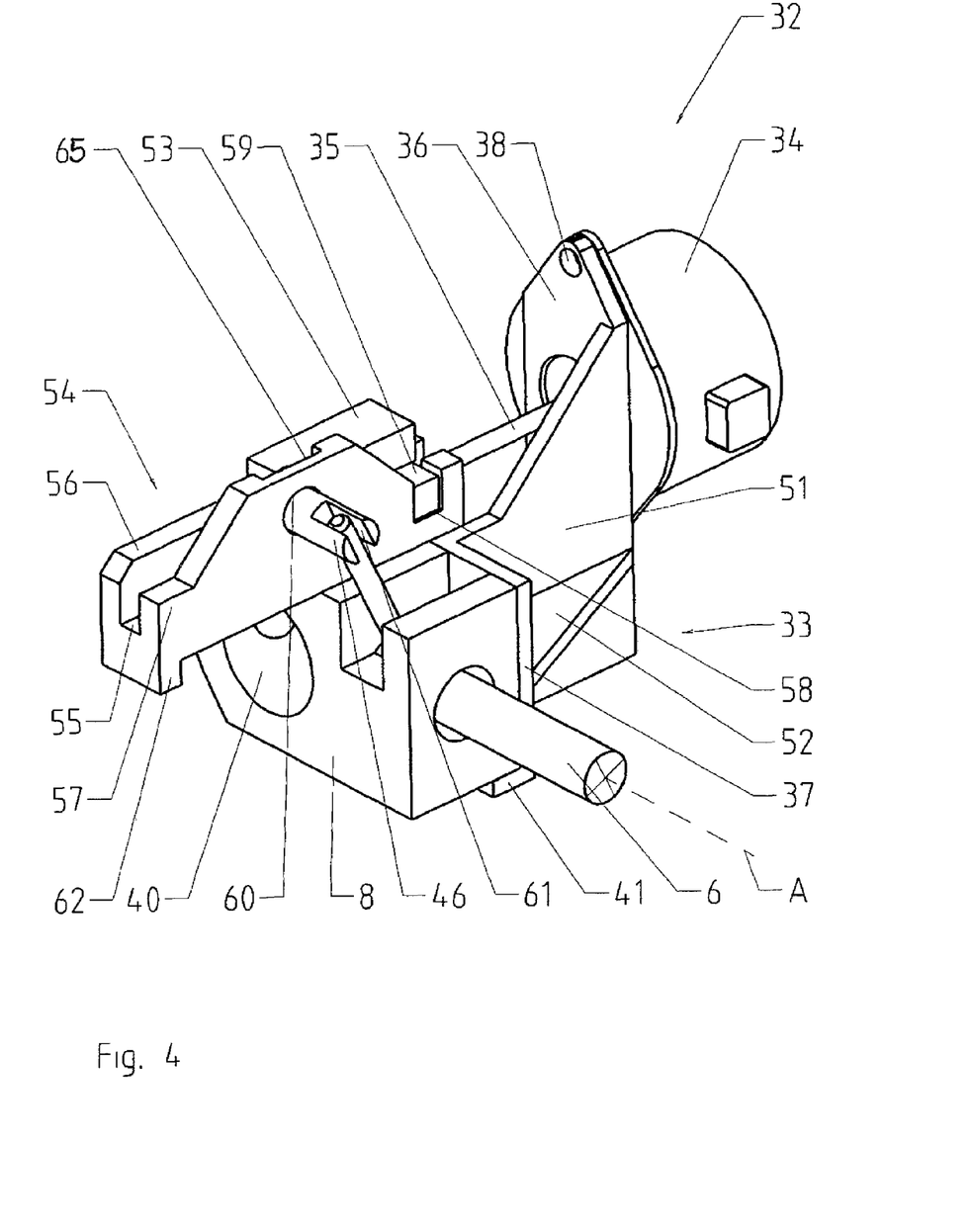
FIG. 4 is a second embodiment of an adjusting unit according to the invention.
Figure 5:
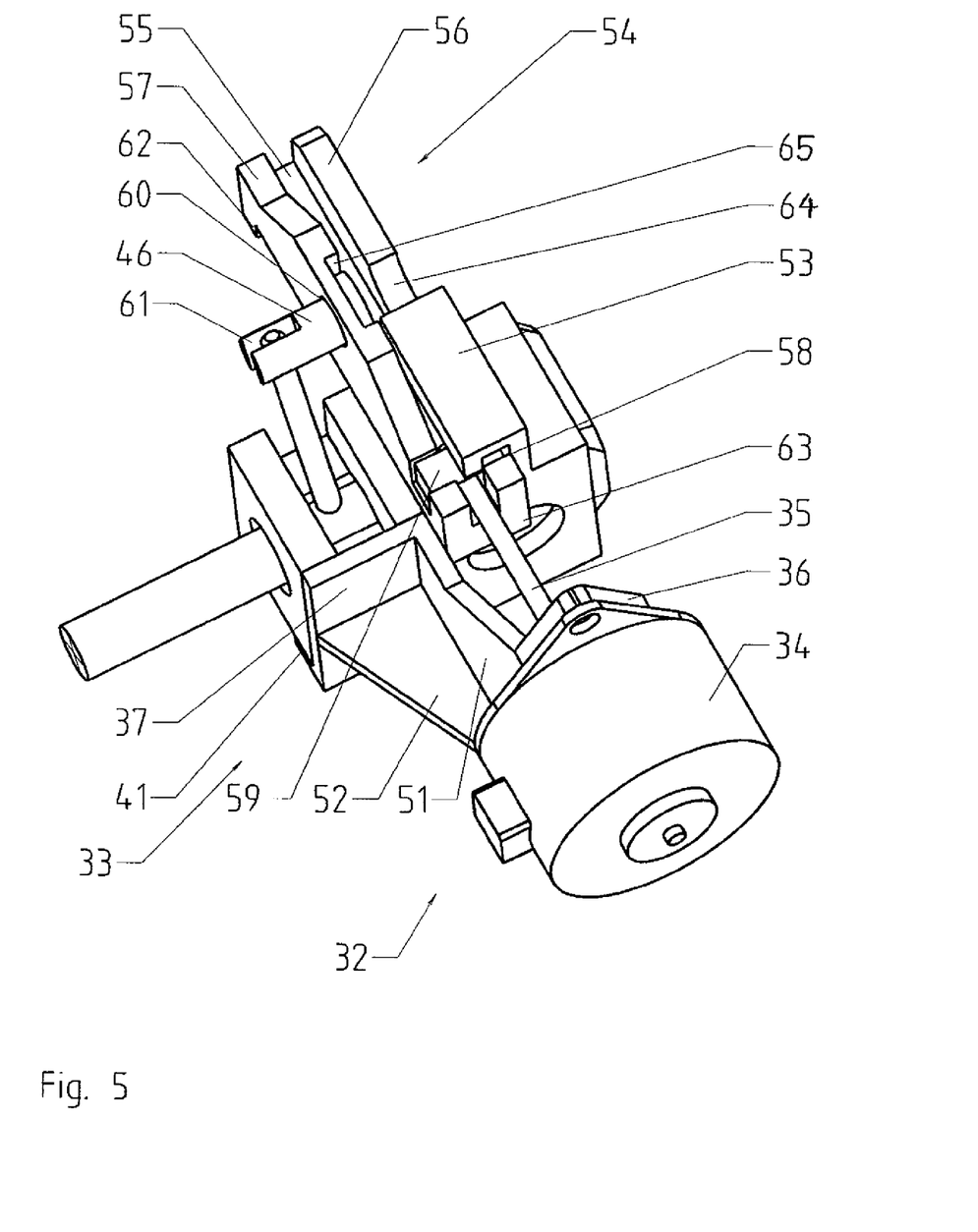
FIG. 5 is a detailed view of the adjusting unit according to the embodiment of FIG. 4.
Figure 6:
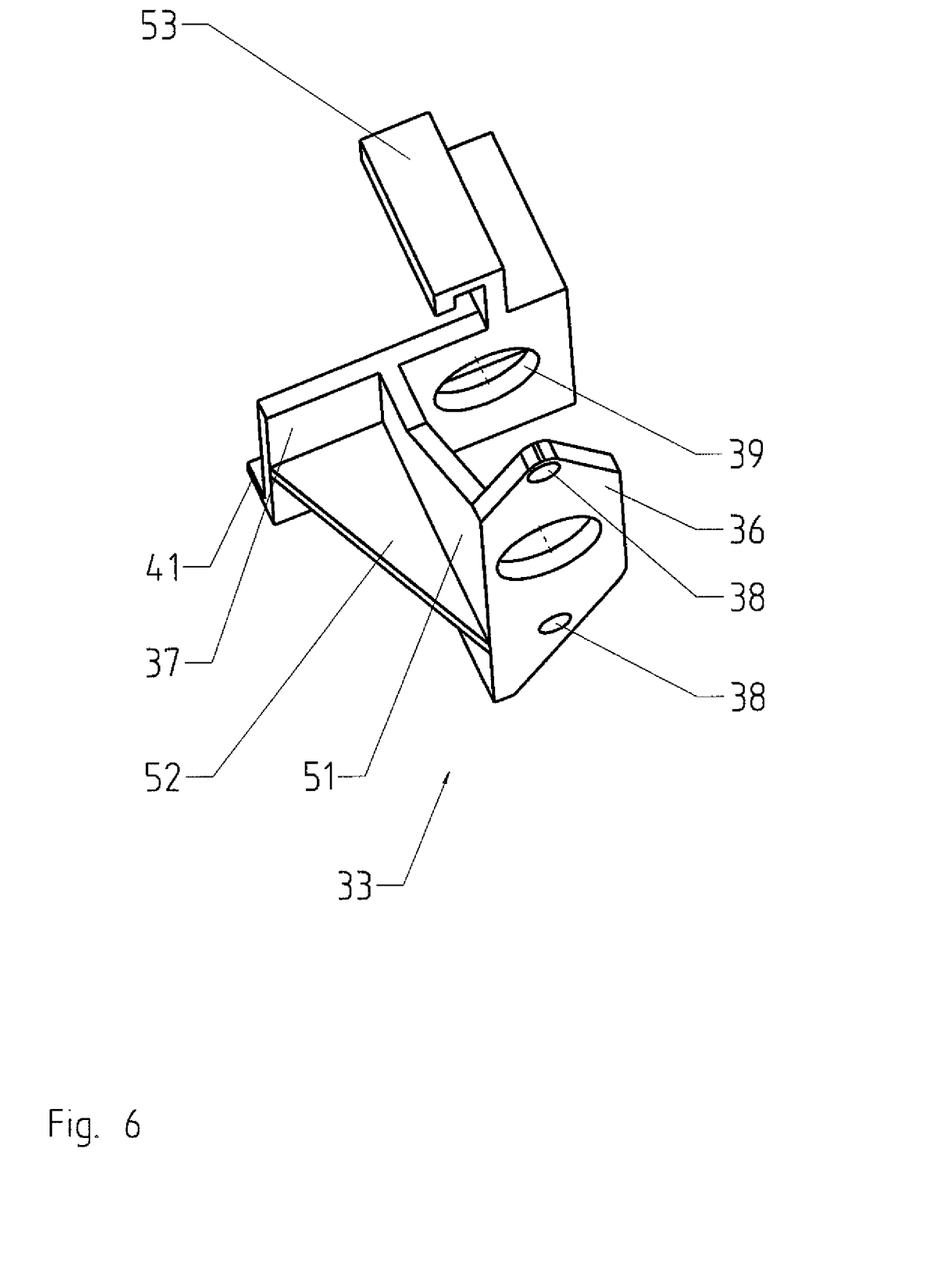
FIG. 6 is a detailed view of a structural component part from FIG. 4.

FIGS. 4 and 5 show another embodiment form of the adjusting unit 32 with a detail of the fastening element shown in FIG. 6. A stepper motor which can set the shaft 35 in rotation is arranged in the housing 34. The shaft 35 is constructed as a threaded spindle, the shaft axis extending substantially perpendicular to the center longitudinal axis A. The housing 34 can be connected to the connection element 8 by the fastening element 33. The fastening element 33 which is also shown in detail in FIG. 6 comprises a first connection plate 36 which can be connected to the housing 34 and a second connection plate 37 which can be connected to the connection element 8. The first connection plate 36 has two connecting devices 38 which serve to receive screws, not shown, to screw the first connection plate 36 to the housing 34. The second connection plate 37 has an opening 39 which is shown most clearly in FIG. 6 and which is made to overlap with the bore hole 40 in the connection element 8. The second connection plate 37 can be connected to the connection element 8 by a bolt, not shown, which extends through the opening 39 and the bore hole 40.

The first connection plate 36 and second connection plate 37 are connected to one another by a tie plate 51 and are oriented substantially parallel to one another. In order to make the tie plate 51 more stable, a web 52 extends from the second connection plate 37 over the tie plate 51 in direction of the first connection plate 36.

In order to stabilize the fastening element 33, an extension 41, which at least partly encloses an edge of the connection element 8, is formed at the second connection plate 37. The second connection plate 37 further comprises a holding finger 53 whose function will be described in the following. A slide 54 which is substantially U-shaped in cross section and has a base 55, a first leg 56 and a second leg 57 is arranged so as to lie on the connection element 8 and the second connection plate 37.

At the side facing the first connection plate 36, each leg 56, 57 of the slide 54 has a cutout 58 in which is inserted a square spindle nut 59. The shaft 35 extends through the spindle nut 59 so that it can move the slide 54 back and forth. The holding finger 53 likewise has a substantially U-shaped profile and encloses the first leg 56 of the slide 54 so that the latter is securely guided. A bore hole 60 through which the bolt 46 extends so as to be rotatable is provided in the second leg 57 of the slide 54. To facilitate assembly, the bolt 46 has an axial slot 61 into which the lever 10 projects.

At both ends of the slide 54, stop devices 62 and 63 project from the base 55 at the side opposite the legs 56 and 57 and limit the displacement path of the slide 54. The displacement path is selected in such a way that the bolt 46 is always covered by the holding finger 53 so that it cannot fall out of the bore hole 60. A groove 64 is provided at the first leg 56 of the slide 54 and a recess 65 for the head of the bolt 46 is formed at the second leg 57 so that the bolt 46 can be inserted more easily into the bore hole 60 and the slide 54 can slide past the head of the bolt 46 at the holding finger 53.

When the stop device 63 contacts the second connection plate 37, the valve needle 6 is rotated in such a way that fluid can flow from one work space to the other; when the stop device 62 contacts the connection element 8, the valve needle 6 is rotated in such a way that the at least one throughflow channel 22 is closed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A piston-cylinder unit comprising:
   a work cylinder filled with a fluid under pressure;
   a hollow piston rod displaceably arranged along a center longitudinal axis in the work cylinder, coaxial to the work cylinder;
   a connection element located at an end of the hollow piston rod outside the work cylinder;
   a piston at an end of the hollow piston rod located in the work cylinder, configured to divide the work cylinder into a first work space and a second work space;
   a valve needle arranged in the piston rod;
   at least one throughflow channel arranged in the piston rod extending in a axial direction, the valve needle having a recess at one end, and being rotatable into a position such that the recess and throughflow channel are located opposite one another in a defined area to control a fluid;
   an adjusting unit; and
   a lever arranged at and end of the valve needle outside the work cylinder that extends in radial direction and is swivelably acted upon by the adjusting unit,
   wherein the adjusting unit is arranged at the connection element entirely outside a flow of force of the piston-cylinder unit and comprises:
   an electrically driven motor;
   a shaft configured to be driven by the motor;
   a disk having a recess and a receiving device fastened to the shaft; and
   a bolt rotatably supported in the receiving device and having a through-bore defined by a cylinder that extends perpendicularly to a longitudinal axis of the bolt through which the lever extends.

2. The piston-cylinder unit according to claim 1, wherein the adjusting unit comprises:
   a housing in which the electrically driven motor is arranged,
   wherein the shaft is configured to be driven by the motor and projects out of the housing axially parallel to the valve needle and that extends through a first connection plate of a fastening element configured to fasten the housing to the connection element.

3. The piston-cylinder unit according to claim 2, wherein the fastening element comprises:
   the first connection plate configured to be connected to the housing; and
   a second connection plate configured to be connected to the connection element, wherein the second connection plate has an opening that overlaps with a bore hole in the connection element to connect the second connection plate to the connection element by a bolt.

4. The piston-cylinder unit according to claim 3, further comprising:
   an extension configured to at least partially enclose an edge of the connection element formed at the second connection plate; and
   a flanking wall formed at the first connection plate.

5. The piston-cylinder unit according to claim 2, wherein the first connection plate and a second connection plate are constructed in one piece and are arranged at an angle of substantially 90° relative to one another.

6. The piston-cylinder unit according to claim 2, further comprising a stop cam with a first stop face and a second stop face arranged at a side of the first connection plate facing the disk, the stop cam projecting into the recess of the disk.

7. The piston-cylinder unit according to claim 2, wherein the adjusting unit further comprises:
   a gear unit arranged in the housing,
   wherein the shaft is configured to be driven by the motor and the gear unit.

8. The piston-cylinder unit according to claim 7, wherein the fastening element comprises:
   the first connection plate configured to be connected to the housing; and
   a second connection plate configured to be connected to the connection element,
   wherein the second connection plate has an opening that overlaps with a bore hole in the connection element to connect the second connection plate to the connection element by a bolt.

* * * * *